US012781100B2

(12) United States Patent
Volp et al.

(10) Patent No.: US 12,781,100 B2
(45) Date of Patent: Nov. 3, 2026

(54) ADHESIVE COMPOSITION COMPRISING POLAR (METH)ACRYLATE MONOMER AND EPOXY RESIN, ARTICLES AND METHODS

(71) Applicant: 3M INNOVATIVE PROPERTIES COMPANY, St. Paul, MN (US)

(72) Inventors: Kelly A. Volp, Minneapolis, MN (US); Jacob P. Podkaminer, St. Paul, MN (US); Clinton J. Cook, Woodbury, MN (US); Peter O. Rekow, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 19/101,668

(22) PCT Filed: Sep. 5, 2023

(86) PCT No.: PCT/IB2023/058782

§ 371 (c)(1),
(2) Date: Feb. 6, 2025

(87) PCT Pub. No.: WO2024/074908

PCT Pub. Date: Apr. 11, 2024

(65) Prior Publication Data

US 2026/0008943 A1 Jan. 8, 2026

Related U.S. Application Data

(60) Provisional application No. 63/412,600, filed on Oct. 3, 2022.

(51) Int. Cl.
*C09J 7/38* (2018.01)
*C09J 5/00* (2006.01)

(52) U.S. Cl.
CPC . *C09J 7/38* (2018.01); *C09J 5/00* (2013.01); *C09J 2203/33* (2013.01); *C09J 2301/414* (2020.08)

(58) Field of Classification Search
CPC ..... C09J 7/38; C09J 4/06; C09J 133/06; C09J 2203/33; C09J 2301/414; C09J 2467/00; C09J 2433/00; C08F 220/1804; C08F 220/1808; C08F 220/281; C08F 220/282
See application file for complete search history.

(56) References Cited

U.S. PATENT DOCUMENTS 3,708,296 A 1/1973 Schlesinger
4,069,055 A 1/1978 Crivello
4,216,288 A 8/1980 Crivello
4,250,311 A 2/1981 Crivello
4,330,590 A 5/1982 Vesley
5,084,586 A 1/1992 Farooq
5,124,417 A 6/1992 Farooq
5,554,664 A 9/1996 Lamanna et al.
6,235,850 B1 5/2001 Perez et al.
9,290,682 B2 * 3/2016 Chen ...................... C09J 133/08
10,153,473 B2 * 12/2018 Miyazawa .......... H01M 50/489
10,676,655 B2 6/2020 Shafer et al.
11,034,866 B2 6/2021 Anderson et al.
2008/0188609 A1 * 8/2008 Agarwal ................. C08L 63/00 524/500
2011/0003947 A1 * 1/2011 Kishi .................. C08F 297/026 525/92 H
2012/0288692 A1 11/2012 Broyles et al.
2018/0127625 A1 * 5/2018 Shafer .................... C09J 133/14
2020/0270492 A1 * 8/2020 Shafer .................... C09J 163/00
2021/0206897 A1 7/2021 Volp et al.
2022/0081599 A1 3/2022 Irie et al.
2024/0084125 A1 * 3/2024 Janoski .................. C09J 153/02

FOREIGN PATENT DOCUMENTS

CN 102952503 B 11/2015
WO 2016195970 A1 12/2016
WO 2020240343 A1 12/2020
WO 2021023217 A1 2/2021
WO 2022058813 A1 3/2022

OTHER PUBLICATIONS

Aran, et al., "Tailoring the Swelling and Glass-Transition Temperature of Acrylonitrile/Hydroxyethyl Acrylate Copolymers", Journal of Applied Polymer Science, vol. 116, (2010), pp. 628-635.
International Search report for PCT International Application No. PCT/IB2023/058782, mailed on Dec. 8, 2023, 5 Pages.
Sideridou-Karayannidou, "Synthesis and characterization of copolymers of N-vinylcarbazole and N,N-dimethylaminoethyl acrylate", Polymer, 1999, vol. 40, pp. 4915-4922.

* cited by examiner

*Primary Examiner* — Scott R. Walshon
(74) *Attorney, Agent, or Firm* — Carolyn A. Fischer

(57) ABSTRACT

Adhesive compositions are described comprises 30-50 wt. % of an epoxy resin component; and 20 to 50 wt. % of (e.g. (meth)acrylic polymer comprising polymerized units of) monofunctional (meth)acrylate monomers comprising i) low Tg (meth)acrylate monomer(s) wherein a homopolymer thereof has a glass transition temperature (Tg) of less than 0° C. in an amount of at least 20 wt. %; and ii) non-acidic polar (meth)acrylate monomer(s) in an amount of at least 20 wt. %; wherein the amount of monomers is based on the total amount of monofunctional (meth)acrylate monomers. Also described are methods of bonding and articles.

28 Claims, No Drawings

ADHESIVE COMPOSITION COMPRISING POLAR (METH)ACRYLATE MONOMER AND EPOXY RESIN, ARTICLES AND METHODS

SUMMARY

In one embodiment, the adhesive composition comprises:

30-50 wt. % of an epoxy resin component; and 20 to 50 wt. % of (meth)acrylic polymer comprising polymerized units of monofunctional (meth)acrylate monomers comprising:

i) low Tg (meth)acrylate monomer(s) wherein a homopolymer thereof has a glass transition temperature (Tg) of less than 0° C. in an amount of at least 20 wt. %; and ii) non-acidic polar (meth)acrylate monomer(s) in an amount of at least 20 wt. %;

wherein the amount of monomers is based on the total amount of monofunctional (meth)acrylate monomers.

In another embodiments, the adhesive composition comprises:

30-50 wt. % of an epoxy resin component; and 20 to 50 wt. % of monofunctional (meth)acrylate monomers comprising i) and ii).

In some embodiments, the adhesive composition has two Tgs after curing of the monofunctional (meth)acrylate monomers and epoxy resin component.

In another embodiment, the adhesive comprises one or more non-acidic high Tg (meth)acrylate monomer(s) such as monomers comprising a cycloaliphatic moiety.

Also described are methods of bonding and articles.

In some embodiments, the article is a tape comprising a layer of the adhesive composition disposed on one major surface or both major surfaces of a (e.g. polymeric film or release liner) substrate.

The epoxy resin component of the adhesive (e.g. tape) article is uncured.

In another embodiment, the article is a battery or component thereof.

DETAILED DESCRIPTION

Presently described are adhesive compositions comprising (meth)acrylate monomers and an epoxy resin component, articles, and methods of bonding.

The adhesive composition comprises (e.g. polymerized units of) low glass transition temperature (Tg) monomer(s) and non-acidic polar monomers. In some embodiments, the adhesive composition comprises other monomers, such as high Tg monomers and crosslinkers.

The adhesive composition comprises (e.g. polymerized units of) one or more low Tg (meth)acrylate monomers, i.e. a (meth)acrylate monomer when reacted to form a homopolymer has a Tg no greater than 0° C. In some embodiments, the low Tg monomer has a Tg no greater than −10, −20, −30, −40, −50, or −60° C. The Tg of the homopolymer of the low Tg monomer is often at least −80° C., −70° C., −60° C., or −50° C.

The low Tg monomer is typically a monofunctional alkyl (meth)acrylate monomer having the formula $$H_2C{=}CR^1C(O)OR^8$$

wherein $R^1$ is H or methyl and $R^8$ is an alkyl with 4 to 22 carbons. The alkyl group is typically linear or branched. The term "monofunctional" refers to the monomer having one (meth)acrylate group.

Exemplary low Tg monomers monofunctional alkyl (meth)acrylate monomers include for example ethyl acrylate, n-propyl acrylate, n-butyl acrylate (BA), isobutyl acrylate, t-butyl acrylate, n-pentyl acrylate, isoamyl acrylate, n-hexyl acrylate, 2-methylbutyl acrylate, 2-ethylhexyl acrylate (2EHA), 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, and dodecyl acrylate.

In typical embodiments, the adhesive composition comprises (e.g. polymerized units of) low Tg monofunctional alkyl monomer(s) having an alkyl group with 4 to 12 carbon atoms. Exemplary monomers include, but are not limited to, butyl acrylate, 2-ethylhexyl (meth)acrylate, isooctyl acrylate, n-octyl (meth)acrylate, 2-octyl (meth)acrylate, isodecyl (meth)acrylate, and lauryl acrylate.

In some embodiments, the monomer may be an ester of (meth)acrylic acid with an alcohol derived from a renewable source. A suitable technique for determining whether a material is derived from a renewable resource is through $^{14}C$ analysis according to ASTM D6866-10, method B as described in US2012/0288692. Suitable monomers include 2-octyl (meth)acrylate and (meth)acrylate ester monomers that can be derived from ethanol and 2-methyl butanol.

The adhesive composition comprises a suitable amount of low Tg monomer(s) such that the (meth)acrylic polymer formed by polymerizing the monofunctional (meth)acryl monomers has a Tg of less than 25° C. In some embodiments, the Tg of the (meth)acrylic polymer is no greater than 20, 15, 10, 5, 0, −5, −10, −15, −20, −25, or −30° C. In some embodiments, the glass transition temperature (Tg) of the (meth)acrylic polymer is at least −40 or −35° C. The lower the Tg, the greater the initial tack and peel adhesion of the tape. The Tg of the (meth)acrylic polymer can be calculated by the FOX equation (see Hiemenz and Lodge, *Polymer Chemistry, Second Edition,* 2007, pp. 492-495).

The adhesive composition comprises at least 10, 15, 20, 25, 30, 35, 40, 45, or 50 wt. % of (e.g. polymerized units) of low Tg monofunctional alkyl (meth)acrylate monomer(s), based on the total weight of monofunctional (meth)acryl monomer(s). The adhesive composition typically comprises no greater than 70, 65, 60, 55, or 50 wt. % of (e.g. polymerized units of) low Tg monofunctional alkyl (meth) acrylate monomer(s). The adhesive composition typically comprises no greater than 60, 55, or 50 wt. % of (e.g. polymerized units of) low Tg monofunctional alkyl (meth) acrylate monomer(s). It is appreciated that the preferred concentration of low Tg monomer(s) is affected by the Tg and concentration of other (meth)acryl monomers of the adhesive composition.

The adhesive composition further comprises (e.g. polymerized units) one or more polar monomers. Representative polar monomers include acid-functional monomers, hydroxyl functional monomers, ether-containing monomers, nitrogen-containing monomers.

Acid functional groups may be an acid per se, such as a carboxylic acid, or a portion may be salt thereof, such as an alkali metal carboxylate. Acid functional monomers include ethylenically unsaturated carboxylic acids, ethylenically unsaturated sulfonic acids, ethylenically unsaturated phosphonic acids, and mixtures thereof. Examples of such compounds include acrylic acid, methacrylic acid, itaconic acid, fumaric acid, crotonic acid, citraconic acid, maleic acid, oleic acid, b-carboxyethyl (meth)acrylate, 2-sulfoethyl methacrylate, styrene sulfonic acid, 2-acrylamido-2-methyl-propanesulfonic acid, vinylphosphonic acid, and mixtures thereof.

In some embodiments, such as when the adhesive is intended to adhere to metal, the adhesive composition comprises little or no acid functional monomers to avoid corrosion. Too much acidic monomer can also reduce the shelf life of the tape by activating the epoxy cure prematurely. Thus, in typical embodiment, the amount of acid functional monomer is zero or less than 5, 4, 3, 2, 1, 0.5, 0.1 wt. % of the total amount of (meth)acrylate monomers of the adhesive composition.

In typical embodiments, the adhesive composition comprises little or no nitrogen-containing monomers since such monomers can hinder the cationic epoxy cure. Thus, in typical embodiment, the amount of nitrogen-containing monomer is zero or less than 5, 4, 3, 2, 1, 0.5, 0.1 wt. % of the total amount of (meth)acrylate monomers of the adhesive composition.

In typical embodiments, the adhesive composition comprises non-acidic polar monomer or in other words polar monomer(s) that lack acid and nitrogen groups.

One class of non-acidic polar monomers are mono (meth) acrylate monomers comprising ether groups, such as tetrahydrofurfuryl acrylate (THFA).

Another class of non-acidic polar monomers includes hydroxy-functional (meth)acrylate monomers. Representative examples include 2-(2-ethoxyethoxy)ethyl (meth)acrylate, 2-exthoxyethyl (meth)acrylate, 2-hydroxyethyl (meth) acrylate, 2-(methoxyethoxy)ethyl, 2-methoxyethyl methacrylate, 4-hydroxybutyl acrylate, 2-phenoxyethyl acrylate, hydroxypropyl acrylate and polyethylene glycol mono (meth)acrylates.

In some embodiments, the adhesive composition comprises little or non-acidic polar monomers with aromatic groups, such as 2-phenoxyethyl acrylate. In this embodiment, the amount of aromatic polar monomers is zero or less than 10, 9, 8, 7, 6, 5, 4, 3, 2, 1 wt. % of the total amount of (meth)acrylate monomers of the adhesive composition.

In some embodiments, the polar monomer has a low Tg (i.e. no greater than 0° C.). In some embodiments, the polar monomer has a Tg no greater than −10, −20, −30, −40, or −50° C. The Tg of the homopolymer of the non-acidic polar monomer may be at least −50, −40, −30, −20, or −10° C. Representative examples include tetrahydrofurfuryl acrylate and 2-(2-ethoxyethoxy)ethyl acrylate. Low Tg polar monomer(s) can be used at relatively high concentrations to produce a (meth)acrylic polymer having a Tg less than 0° C., as previously described.

With reference to the forthcoming examples, the type and amount of polar monomer can be selected to induce phase separation of the adhesive composition. Whereas a compatible single phase adhesive composition (e.g. of a tape having an adhesive layer with a thickness of 10 mils (250 microns) comprising (meth)acrylic polymer and uncured epoxy resin(s)) is clear (i.e. in the absence of opacifying agents such as pigment) the adhesive compositions described herein are translucent or opaque. A compatible single phase adhesive composition typically also has a single Tg after curing of the epoxy resin(s) (as determined by Dynamic Mechanical Analysis as further described in the examples). In contrast, the cured adhesive composition of the present invention can have more than one Tg.

In some embodiments, the adhesive composition comprises a first Tg is in a range from −10° C. to 50° C. In some embodiments, the first Tg is at least −15, −10, −5, 0, 5, 10, 15, 20, 25, 30, 35, or 40° C. In some embodiments, the first Tg is no greater than 35, 30, 25, 20, 15, 10, 5, or 0° C. In some embodiments, the adhesive composition has a tan (δ) at the first Tg temperature of less than 0.85, 0.80, 0.75, 0.70, 0.65, or 0.60. In some embodiments, the adhesive composition has a tan (δ) at the first Tg temperature of at least 0.2, 0.3, or 0.4.

In some embodiments, the adhesive composition comprises a second Tg of at least 50, 55, 60, 65, 70, 75° C. In some embodiments, the second Tg is no greater than 85, 80, 75, 70, 65° C. In some embodiments, the adhesive composition has a tan (δ) at the second Tg temperature of less than 0.50, 0.40, or 0.30. In some embodiments, the adhesive composition has a tan (δ) at the first Tg temperature of at least 0.1, 0.15, or 0.2. Thus, the adhesive composition has more than one phase and may also be characterized as an interpenetrating polymer network.

In some embodiments, the adhesive composition comprises a low Tg monofunctional alkyl (meth)acrylate, such as EHA and a polar monomer, such as THFA. Notably when the (meth)acrylate monomers comprise 2EHA/THFA at a weight ratio of 40/60 the tape comprising (meth)acrylic polymer and uncured epoxy resin(s) is clear, but opaque at a weight ratio of 50/50. Thus, when this combination of monomer is utilized the amount of non-acidic polar monomer (THFA) is less than 60, 59, 58, 57, 56, 55, 54, 53, 52, or 51 wt. %, based on the total weight of the (e.g. polymerized units of) monofunctional (meth)acrylate monomers of the adhesive composition. Notably BA/THFA at ratios ranging from 50/50 to 70/30 are clear and have a single Tg. However, other composition with BA and THFA are opaque and having two Tgs.

In some embodiments, the adhesive composition comprises one or more (e.g. non-polar, non-acidic) high Tg monofunctional alkyl (meth)acrylate monomers, i.e. a (meth)acrylate monomer when reacted to form a homopolymer has a Tg of at least 25, 30, 35, 40, 45, or 50° C. In some embodiments, a homopolymer of the high Tg monomer has a Tg of at least 55, 60, 65, 70, 75, 80, 85, or 90° C. In some embodiments, the high Tg monomer has a Tg no greater than 125 or 100° C. In some embodiments, the high Tg monomer comprises a cyclic group.

Representative high Tg monomers include t-butyl acrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, norbornyl (meth)acrylate, benzyl methacrylate, 3,3,5 trimethylcyclohexyl acrylate, cyclohexyl acrylate, t-butyl cyclohexyl acrylate, and propyl methacrylate or combinations.

In some embodiments, the adhesive composition comprises at least 10, 15, 20, 25, 30, 35, 40, 45, or 50 wt. % of high Tg monofunctional alkyl (meth)acrylate monomer(s), based on the total amount of (e.g. polymerized units of) monofunctional (meth)acryl monomers. In some embodiments, the adhesive composition comprises no greater than 50, 45, 40, 35, 30, 25, or 20 wt. % of high Tg monofunctional (meth)acryl monomer(s).

In one embodiment, the adhesive composition comprises the monofunctional (meth)acrylate monomers or (meth) acrylic copolymer thereof in combination with a second (meth)acrylic copolymer. The second (meth)acrylic copolymer comprises polymerized units of a high Tg monofunctional (meth)acrylate monomer, as described herein, and a polar monomer, as described herein. In one embodiment, the second copolymer comprises polymerized units of isobornyl acrylate and acrylic acid at a weight ratio of 97/3. The second (meth)acrylic copolymer may have a molecular weight (Mw) of at least 10,000; 15,000; or 20,000 ranging up to 50,000 g/mole. Thus, in this embodiment, the adhesive composition comprises low concentrations of polymerized units of acidic polar monomers, as previously described. However, when adding a (e.g. preformed) (meth)acrylic copolymer comprising polymerized acidic polar monomers, the amount of residual acidic monomer can be essentially zero.

The Tg of the homopolymer of various monomers is known and is reported in various handbooks. The following table sets forth the Tg of some illustrative monomers as reported (unless specified otherwise) in *Polymer Handbook*, $4^{th}$ edition, edited by J. Brandrup, E.H. Immergut, and E.A. Grulke, associate editors A. Abe and D.R. Bloch, J. Wiley and Sons, New York. 1999.

Glass Transition Temperature (Tg) of the Homopolymer of Monomers

| | Tg, ° C. | | Tg, ° C. |
|---|---|---|---|
| Methyl methacrylate | 105 | Methacrylic acid | 223 |
| Isobutyl methacrylate | 53 | 2-hydroxyethyl acrylate | 4 (b) |
| Hexyl methacrylate | −5 | 2-hydroxyethyl methacrylate | 85 |
| Methyl acrylate | 10 | N-vinyl carbazole | 212 (a) |
| Butyl acrylate | −54 | N,N-dimethyl acrylamide | 89 |
| t-butyl acrylate | 38 | Isopropyl methacrylate | 83 |
| t-butyl methacrylate | 118 | n-butyl methacrylate | 21 |
| s-butyl methacrylate | 60 | stearyl methacrylate | 39 |
| phenyl methacrylate | 110 | benzyl methacrylate | 54 |
| 3,3,5-trimethylcyclohexyl acrylate | 29 | Propyl methacrylate | 46 |
| 2-octyl acrylate | −45 | N-vinyl pyrrolidone | 54 |
| 2-ethylhexyl acrylate | −65 | N,N-Dimethylamino ethyl acrylate | −39 (a) |
| Isobornyl acrylate | 94 | N,N-Dimethylamino ethyl methacrylate | 19 |
| Acrylic acid | 106 | Tetrahydrofurfuryl acrylate | −13 |
| 2-(2-Ethoxyethoxy)ethyl Acrylate | −56 | t-butyl cyclohexyl acrylate | 65 |
| Isobornyl methacrylate | 110 | Isooctyl acrylate | −65 |
| 2-ethylhexyl methacrylate | −10 | Hydroxypropyl acrylate | −7 |
| 2-phenoxyethyl acrylate | 6 | Cyclohexyl methacrylate | 116 |
| 4-hydroxybutyl acrylate | −32 | lauryl methacrylate | −65 |
| t-butyl cyclohexyl methacrylate | 117 | | |

(a) I. Sideridou-Karayannidou and G. Seretoudi, *Polymer*, Vol. 40, Issue 17, 1999, pp. 4915-4922.
(b) B. Aran, M. Sankir, E. Vargun, N. D. Sankir, and A. Usanmaz; *Journal of Applied Polymer Science,* Wiley Periodicals, Inc., A Wiley Company, 2010, Vol. 116, pp. 628-635

The adhesive composition may optionally comprise other ethylenically unsaturated monomers. In some embodiments, the adhesive composition comprises monofunctional ethylenically unsaturated (e.g. (meth)acrylate) monomers having a Tg greater than 0° C. and less than 25° C. such as methyl acrylate. In other embodiments, the adhesive composition lacks monomers in such Tg range.

In some embodiments, the adhesive composition further comprises vinyl monomers such as vinyl esters (e.g., vinyl acetate and vinyl propionate), styrene, substituted styrene (e.g., a-methyl styrene), vinyl halide, and mixtures thereof.

In typical embodiments, the low Tg (meth)acrylate monomer(s), polar (meth)acrylate monomer(s) and other monomers including high Tg (meth)acrylate monomers are polymerized to form a random (meth)acrylic polymer copolymer. In some embodiments, the polymerized units of the (meth)acrylic polymer lack aromatic moieties.

The adhesive comprises one or more epoxy resins. The epoxy resins or epoxides are organic compound having at least one oxirane ring that is polymerizable by ring opening, i.e., an average epoxy functionality greater than one, and preferably at least two. The epoxides can be monomeric or polymeric, and aliphatic, cycloaliphatic, heterocyclic, aromatic, hydrogenated, or mixtures thereof. Preferred epoxides contain more than 1.5 epoxy group per molecule and preferably at least 2 epoxy groups per molecule. The useful materials typically have a weight average molecular weight of about 150 to about 10,000, and more typically of about 180 to about 1,000. The molecular weight of the epoxy resin is usually selected to provide the desired properties of the cured adhesive. Suitable epoxy resins include linear polymeric epoxides having terminal epoxy groups (e.g., a diglycidyl ether of a polyoxyalkylene glycol), polymeric epoxides having skeletal epoxy groups (e.g., polybutadiene poly epoxy), and polymeric epoxides having pendant epoxy groups (e.g., a glycidyl methacrylate polymer or copolymer), and mixtures thereof. The epoxide-containing materials include compounds having the general formula:

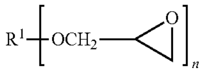

where $R^1$ is an alkyl, alkyl ether, or aryl, and n is 1 to 6.

Epoxy resins include aromatic glycidyl ethers, e.g., such as those prepared by reacting a polyhydric phenol with an excess of epichlorohydrin, cycloaliphatic glycidyl ethers, hydrogenated glycidyl ethers, and mixtures thereof. Such polyhydric phenols may include resorcinol, catechol, hydroquinone, and the polynuclear phenols such as p,p'-dihydroxydibenzyl, p,p'-dihydroxydiphenyl, p,p'-dihydroxyphenyl sulfone, p,p'-dihydroxybenzophenone, 2,2'-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Also useful are polyhydric phenolic formaldehyde condensation products as well as polyglycidyl ethers that contain as reactive groups only epoxy groups or hydroxy groups. Useful curable epoxy resins are also described in various publications including, for example, "Handbook of Epoxy Resins" by Lee and Nevill, McGraw-Hill Book Co., New York (1967), and Encyclopedia of Polymer Science and Technology, 6, p.322 (1986).

Examples of commercially available epoxides include diglycidyl ethers of bisphenol A (e.g. those available under the trade designations EPON 828, EPON 1001, EPON 1004, EPON 1007, EPON 2004, EPON 1510, and EPON 1310 from Momentive Specialty Chemicals, Inc., and those under the trade designations D.E.R. 331, D.E.R. 332, D.E.R. 334, and D.E.N. 439 available from Dow Chemical Co.); diglycidyl ethers of bisphenol F (e.g., that are available under the trade designation ARALDITE GY 281 available from Huntsman Corporation); silicone resins containing diglycidyl epoxy functionality; flame retardant epoxy resins (e.g., that are available under the trade designation DER 560, a brominated bisphenol type epoxy resin available from Dow Chemical Co.); and 1,4-butanediol diglycidyl ethers.

In some embodiments, the adhesive comprises an epoxy resin having an epoxy equivalent weight (EEW) of at least 100, 150, 200, 250, 300, 350, 400, 450, 500, 550, 600, 650, 700, 750, 800, 850, 900, 950, 1000 or a range of EEW having a minimum or maximum from such stated values. In some embodiments, the adhesive comprises an epoxy resin having an epoxy equivalent weight (EEW) of at least 1500, 2000, 2500, 3000, 3500, 4000, 4500, or 5000 or a range of EEW having a minimum or maximum from such stated values. Various combination of epoxy resin(s) can be used having different ranges of epoxy equivalent weight.

In typical embodiments, the adhesive composition comprises one or more aromatic epoxy resin(s), such as those comprising bisphenol moieties. In other embodiments, a mixture of aromatic epoxy resin and non-aromatic epoxy resin is utilized.

The adhesive composition typically comprises at least 25, 30, 35, or 40 wt. % of epoxy resin(s) based on the total of (meth)acrylate monomers and epoxy resin. In some embodiments, The adhesive composition comprises no greater than 50 wt. % of epoxy resin(s).

The adhesive composition typically comprises a hydroxyl-containing component that lacks a (meth)acrylate group. The hydroxyl-containing compound acts as a chain transfer agent when the epoxy groups react according to a cation mechanism. When present the amount of hydroxyl-containing component typically ranges from 5 to 15 wt. % of the adhesive composition.

In some embodiments, the hydroxyl-containing compound is polyol such as a polyether polyol and a polyester polyol. The polyether polyol includes, but is not limited to, one or a plurality from the group consisting of a polyether triol and a polyether diol. Various polyether polyols are known typically having a molecular weight of at least 500, 1000, or 1500, or 2000 g/mole. In some embodiments, the polyether polyol has a molecular weight no greater than 5000, 4000, or 3000 g/mole.

In some embodiments, the adhesive composition comprises a crosslinker. The crosslinker may comprise free-radically polymerizable groups, such as (meth)acrylate groups. In some embodiments, the crosslinker comprising at least two and typically no greater than 6, 5, 4, or 3 ethylenically unsaturated groups capable of crosslinking polymerized units of the (meth)acrylic polymer.

Examples of useful (e.g. aliphatic) multifunctional (meth) acrylate include, but are not limited to, di(meth)acrylates, tri (meth)acrylates, and tetra(meth)acrylates, such as 1,6-hexanediol di(meth)acrylate, poly(ethylene glycol) di(meth) acrylates, polybutadiene di(meth)acrylate, polyurethane di(meth)acrylates, propoxylated glycerin tri(meth)acrylate, and mixtures thereof.

In some embodiments, the adhesive composition comprises an interphase crosslinker that comprises at least one epoxy or hydroxyl group and at least one (meth)acrylate. Such compounds can crosslink the cured epoxy with the (meth)acrylic polymer. Representative crosslinkers include 2-hydroxy-3-phenoxypropyl acrylate (HPPA) and glycidyl methacrylate (GMA). Such interphase crosslinkers may be used in amount of at least 0.5 or 1 wt. % and typically no greater than 10 or 5 wt. % of the total weight of the polymerizable components of the adhesive composition. Notably such crosslinker are typically added after forming a (meth)acrylic copolymer from the monofunctional (meth) acrylate monomers.

The adhesive composition may optionally comprise various additives such as fillers, stabilizers, plasticizers, tackifiers, flow control agents, cure rate retarders, adhesion promoters (for example, silanes and titanates), adjuvants, impact modifiers, expandable microspheres, thermally conductive particles, electrically conductive particles, and the like, such as silica, glass, clay, talc, pigments, colorants, glass beads or bubbles, antioxidants, etc.

The adhesive composition can be polymerized by various techniques, such as described in WO2016/195970 (Shafer et al); incorporated herein by reference. In some embodiments, the adhesive is polymerized by solventless radiation polymerization, including processes using electron beam, gamma, and especially ultraviolet light radiation. In this (e.g. ultraviolet light radiation) embodiment, generally little or no methacrylate monomers are utilized. Thus, the adhesive composition comprises zero or no greater than 10, 9, 8, 7, 6, 5, 4, 3, 2, or 1 wt. % of (e.g. polymerized units of) monomers having a methacrylate group.

One method of preparing the adhesive composition comprises dissolving the epoxy resin(s) in a liquid polyol and combining this mixture with the (meth)acrylate monomers. Such monomers may be partially polymerized. Partial polymerization provides a coatable solution of the (meth) acrylic solute polymer in one or more free-radically polymerizable solvent monomers.

The adhesive composition comprises one or more free-radical initiators (e.g. photoinitiators) and cationic initiators in an amount of at least 0.1, 0.2, 0.3, 0.4 or 0.5 wt. % and typically no greater than 1 wt. % of the total adhesive composition. The initiator may be added immediately prior to use of the adhesive composition in a method of bonding.

The adhesive composition typically comprises a free-radical initiator to polymerize the (meth)acrylate monomers.

The free-radical initiator may be a thermal initiator or a photoinitiator of a type and amount effective to polymerize the (meth)acrylic portion of the second polymerizable material. The initiators are typically employed at concentrations ranging from about 0.0001 to about 3.0 parts by weight, preferably from about 0.001 to about 1.0 parts by weight, and more preferably from about 0.005 to about 0.5 parts by weight of the composition.

Suitable thermal initiators include but are not limited to those selected from the group consisting of azo compounds such as VAZO 64 (2,2'-azobis (isobutyronitrile)), VAZO 52 (2,2'-azobis(2,4-dimethylpentanenitrile)), and VAZO 67 (2,2'-azobis-(2-methylbutyronitrile)) available from Chemours (Wilmington, DE, USA), peroxides such as benzoyl peroxide and lauroyl peroxide, and mixtures thereof. A preferred oil-soluble thermal initiator is (2,2'-azobis-(2-methylbutyronitrile)).

Examples of useful photoinitiators include benzoin ethers (e.g., benzoin methyl ether or benzoin butyl ether); acetophenone derivatives (e.g., 2,2-dimethoxy-2-phenylacetophenone or 2,2-diethoxyacetophenone); 1-hydroxy cyclohexyl phenyl ketone; and acylphosphine oxide derivatives and acylphosphonate derivatives (e.g., bis(2,4,6-trimethylbenzoyl)phenylphosphine oxide, diphenyl-2, 4,6-trimethylbenzoylphosphine oxide, isopropoxyphenyl-2,4,6-trimethylbenzoylphosphine oxide, or dimethyl pivaloylphosphonate). Many photoinitiators are available, for example, from IGM Resins (Charlotte, NC, USA) under the trade designation "OMNIRAD". The photoinitiator may be selected, for example, based on the desired wavelength for curing and compatibility with the monomers.

In some embodiments, the cationic initiator may be characterized as a photoacid generator. Upon irradiation with light energy, photoacid generators undergo a fragmentation reaction and release one or more molecules of Lewis or Bronsted acid that induce polymerization of the epoxide groups. Useful photoacid generators are thermally stable, do not undergo thermally induced reactions with the composition, and are readily dissolved or dispersed in the composition. Typical photoacid generators are those in which the incipient acid has a pKa value of <0. Photoacid generators are known and reference may be made to K. Dietliker, Chemistry and Technology of UV and EB Formulation for Coatings, Inks and Paints, vol. III, SITA Technology Ltd., London, 1991. Further reference may be made to Kirk-Othmer Encyclopedia of Chemical Technology, 4th Edition, Supplement Volume, John Wiley and Sons, New York, 1992, pp 253-255.

Cations useful as the cationic portion of ionic photoinitiators include organic onium cations, for example those described in U.S. Pat. Nos. 4,250,311, 3,708,296, 4,069,055, 4,216,288, 5,084,586, 5,124,417, 5,554,664 and such descriptions incorporated herein by reference, including aliphatic or aromatic Group IVA VIIA (CAS version) centered onium salts, preferably I-, S-, P-, Se-N- and C-centered onium salts, such as those selected from, sulfoxonium, iodonium, sulfonium, selenonium, pyridinium, carbonium and phosphonium, and most preferably I-, and S-centered onium salts, such as those selected from sulfoxonium, diaryliodonium, triarylsulfonium, diarylalkylsulfonium, dialkylarylsulfonium, and trialkylsulfonium wherein "aryl" and "alkyl" are as defined and having up to four independently selected substituents. The substituents on the aryl or alkyl moieties will preferably have less than 30 carbon atoms and up to 10 heteroatoms selected from N, S, non-peroxidic O, P, As, Si, Sn, B, Ge, Te, Se. Examples include hydrocarbyl groups such as methyl, ethyl, butyl, dodecyl, tetracosanyl, benzyl, allyl, benzylidene, ethenyl and ethynyl; hydrocarbyloxy groups such as methoxy, butoxy and phenoxy; hydrocarbylmercapto groups such as methylmercapto and phenylmercapto; hydrocarbyloxycarbonyl groups such as methoxycarbonyl and phenoxycarbonyl; hydrocarbylcarbonyl groups such as formyl, acetyl and benzoyl; hydrocarbylcarbonyloxy groups such as acetoxy and cyclohexanecarbonyloxy; hydrocarbylcarbonamido groups such as acetamido and benzamido; azo; boryl; halo groups such as chloro, bromo, iodo and fluoro; hydroxy; oxo; diphenylarsino; diphenylstilbino; trimethylgermano; trimethylsiloxy; and aromatic groups such as cyclopentadienyl, phenyl, tolyl, naphthyl, and indenyl. With the sulfonium salts, it is possible for the substituent to be further substituted with a dialkyl- or diarylsulfonium cation; an example of this would be 1,4-phenylene bis(diphenylsulfonium).

Useful onium salt photoacid generators include diazonium salts, such as aryl diazonium salts; halonium salts, such as diarlyiodonium salts; sulfonium salts, such as triarylsulfonium salts, such as triphenyl sulfonium triflate; selenonium salts, such as triarylselenonium salts; sulfoxonium salts, such as triarylsulfoxonium salts; and other miscellaneous classes of onium salts such as triaryl phosphonium and arsonium salts, and pyrylium and thiopyrylium salts.

Ionic photoacid generators include, for example, bis(4-t-butylphenyl) iodonium hexafluoroantimonate (FP5034™ from Hampford Research Inc., Stratford, CT, USA), a mixture of triarylsulfonium salts (diphenyl(4-phenylthio) phenylsulfonium hexafluoroantimonate, bis(4-(diphenylsulfonio)phenyl)sulfide hexafluoroantimonate) available as Syna PI-6976™ from Synasia, Metuchen, NJ, USA, (4-methoxyphenyl)phenyl iodonium triflate, bis(4-tert-butylphenyl) iodonium camphorsulfonate, bis(4-tert-butylphenyl) iodonium hexafluoroantimonate, bis(4-tert-butylphenyl) iodonium hexafluorophosphate, bis(4-tert-butyl phenyl) iodonium tetraphenylborate, bis(4-tert-butyl phenyl) iodonium tosylate, bis(4-tert-butylphenyl) iodonium triflate, ([4-(octyloxy)phenyl]phenyliodonium hexafluorophosphate), ([4-(octyloxy)phenyl]phenyliodonium hexafluoroantimonate), (4-isopropylphenyl) (4-methylphenyl)iodonium tetrakis (pentafluorophenyl) borate (available as Rhodorsil 2074™ from Bluestar Silicones, East Brunswick, NJ, USA), bis (4-methylphenyl) iodonium hexafluorophosphate (available as Omnicat 440 from IGM Resins, Charlotte, NC, USA), 4-(2-hydroxy-1-tetradecycloxy)phenyl]phenyl iodonium hexafluoroantimonate, triphenyl sulfonium hexafluoroantimonate (available as CT-548 from Chitec Technology Corp. Taipei, Taiwan), diphenyl(4-phenylthio)phenylsulfonium hexafluorophosphate, bis(4-(diphenylsulfonio)phenyl)sulfide bis(hexafluorophosphate), diphenyl(4-phenylthio)phenylsulfonium hexafluoroantimonate, bis(4-(diphenylsulfonio)phenyl)sulfide hexafluoroantimonate, and blends of these triarylsulfonium salts available from Synasia under the trade designations of Syna PI-6992 and Syna PI-6976 for the $PF_6$ and $SbF_6$ salts, respectively.

A preferred photoacid generator in a triaryl sulfonium hexafluoroantimonate salt obtained as a 50% solution in propylene carbonate under the designation "UVI6976" from Aceto Corporation (Port Washington, NY, USA). This solution may be dried to yield the pure solid salt, which is also a preferred photoacid generator.

Other photoacid generators are triazine compounds, such as further described in U.S. Pat. No. 4,330,590.

In typical embodiments, the adhesive composition comprises at least 0.02, 0.5, or 1 wt. % of photoinitiator(s) and typically no greater than 3, 2.5, or 2 wt. %, based on the total adhesive composition.

The adhesive composition comprising the cured monofunctional (meth)acrylate monomer (i.e. (meth)acrylic copolymer thereof) and uncured epoxy resin may be characterized as a pressure sensitive adhesive composition, In some embodiments, the adhesive composition has a pluck cleavage at 80° C. of at least 200, 250, 300, 350, or 400 newtons. In some embodiments, the pluck cleavage at 80° C. is no greater than about 450 newtons. The pluck cleavage at room temperature (25° C.) can be at least 350, 400, 450, 500, 550, 600, 650, 700, 750, 800, 850, 900, 1000 or greater. In some embodiments, the pluck cleavage at 25° C. is no greater than about 1200 newtons. In some embodiments, the cured adhesive composition has a metal (e.g. aluminum) overlap shear at 60° C. of at least 2, 3, 4, or 5 MPa. In some embodiments, the cured adhesive composition has a metal (e.g. aluminum) overlap shear at room temperature (25° C.) of at least 5, 10, or 15 MPa. In some embodiments, the overlap shear is no greater than about 20 or 25 MPa.

Articles and Methods of Bonding

The cured, partially cured or uncured adhesive composition may be coated on a substrate to form an adhesive article. In some embodiments, adhesive articles are described comprising at least one layer of the adhesive composition disposed on a major surface of a substrate. The article may be an adhesive-coated film or a tape.

The substrate can be flexible or inflexible and can be formed from a polymeric material, glass or ceramic material, metal, or combination thereof. Some substrates are polymeric films such as those prepared from polyolefins (e.g., polyethylene, polypropylene, or copolymers thereof), polyurethanes, polyvinyl acetates, polyvinyl chlorides, polyesters (polyethylene terephthalate or polyethylene naphthalate), polycarbonates, polymethyl (meth)acrylates (PMMA), ethylene-vinyl acetate copolymers, and cellulosic materials (e.g., cellulose acetate, cellulose triacetate, and ethyl cellulose).

Other substrates are metal foils, nonwoven materials (e.g., paper, cloth, nonwoven scrims), foams (e.g., polyacrylic, polyethylene, polyurethane, neoprene), and the like. For some substrates, it may be desirable to treat the surface to improve adhesion to the adhesive composition. Such treatments include, for example, application of primer layers, surface modification layer (e.g., corona treatment or surface abrasion), or both.

In some embodiments, the substrate is a release liner, such as in the case of transfer tape adhesive article. Exemplary release liners can be prepared from paper (e.g., Kraft paper) or other types of polymeric (e.g. polyester) material. Some release liners are coated with an outer layer of a release agent such as a silicone-containing material or a fluorocarbon-containing material.

In some embodiments, the article is a tape comprising a layer of the adhesive composition on both major surfaces of the substrate. The epoxy resin components of the tape are uncured. Thus, the tape is a curable pressure-sensitive tape. In one embodiment, the single sided curable pressure-sensitive adhesive tape include an (e.g. electrical) insulating (e.g. substrate) layer and the curable pressure-sensitive adhesive composition layer provided on one side of the insulating layer. In another embodiment, the double-sided curable pressure-sensitive adhesive tape includes an (e.g. electrical) insulating (e.g. substrate) layer and the curable pressure-sensitive adhesive composition layers respectively provided on two sides of the electrical insulating layer.

The electrical insulating layer may comprise an organic polymeric material such as polyester, polycarbonate, polyamide, polyimide, polyacrylate, or polyolefin (e.g. polypropylene or polyethylene). In some embodiments, the thickness of the electrical insulating layer may be 0.002-2 mm, 0.005-1 mm, or 10-500 μm.

The adhesive composition or adhesive article may be used various methods of bonding. In one embodiment, the method of bonding may comprise providing the adhesive (e.g. tape or film) article contacting a layer of the adhesive composition with a surface of an article; and curing the epoxy resin component.

In another embodiment, a method of bonding is described comprising providing the (e.g. liquid) epoxy resin component and mixture of (meth)acrylate monomers or partially cured adhesive composition described herein between a first and second substrate and curing the epoxy resin component.

The surface of the article may comprise any of the previously described substrate materials. In one embodiment, the surface of the article comprises metal. Due to the high pluck cleavage and shear strength, the adhesive is suitable for uses wherein the adhesive is exposed to elevated temperatures. One illustrative article is a battery or component thereof, such as battery packs (including but not limited to vehicle battery packs) as described in WO 2020/240343; incorporated herein by reference.

The battery pack may include a first cell and a cured first curable pressure-sensitive adhesive composition layer as described herein provided on at least part of an outer surface of the first cell. The battery pack may further comprise a (e.g. first electrical) insulating (e.g. substrate) layer on the opposing side of the adhesive layer away from the first cell. Alternatively, the (e.g. first electrical) insulating (e.g. substrate) layer is between two layers of the adhesive.

EXAMPLES

Unless otherwise noted or apparent from the context, all parts, percentages, ratios, etc. in the Examples and the rest of the specification are by weight. Table 1, below, lists materials used in the examples and their sources.

TABLE 1

Table of materials.

| Abbreviation | Description | Source |
|---|---|---|
| THFA | Tetrahydrofurfuryl acrylate - polar | San Esters, New York NY |
| AA | Acrylic acid - polar | TCI America, Portland, OR |
| BA | Butyl acrylate - low Tg | BASF, Ludwigshafen Germany |
| E3A | 2-(2-Ethoxyethoxy)ethyl Acrylate - polar | TCI, Tokyo, Japan |
| TBCHA | t-butyl cyclohexyl acrylate - high Tg | Miwon North America, Exton, PA |
| IBOA | isobornyl acrylate - high Tg | Chempoint, a Univar Company, Calumet City, IL. |
| 2EHA | 2-ethylhexyl acrylate - low Tg | BASF, Ludwigshafen Germany |
| IOA | isooctyl acrylate - low Tg | 3M FMRD |
| HBA | 4-hydroxybutyl acrylate - polar | TCI America, Portland, OR |
| OM651 | Benzyldimethyl ketal photoinitiator obtained under the trade designation OMNIRAD 651 | iGM Resins USA, Charlotte, NC, USA |
| OM819 | Bis(2,4,6-trimethylbenzoyl)-phenylphosphineoxide photoinitiator obtained under the trade designation OMNIRAD 819 | iGM Resins USA |

TABLE 1-continued

| Table of materials. | | |
|---|---|---|
| Abbreviation | Description | Source |
| HDDA | Hexanediol diacrylate - crosslinker | Allnex USA Inc., Alpharetta GA |
| EPON 828 | epoxy resin comprised of diglycidyether of bisphenol A (EEW 185-195 g/eq) | Momentive Specialty Chemicals, Inc., Columbus, OH |
| EPON 1001 | epoxy resin comprised of diglycidyether of bisphenol A (EEW 525-550 g/eq) | Momentive Specialty Chemicals, Inc., Columbus, OH |
| EPON 1007 | epoxy resin comprised of diglycidyether of bisphenol A with higher molecular weight (EEW 2300-3800 g/eq) | Momentive Specialty Chemicals, Inc., Columbus, OH |
| EPON 872 | chemically modified BPA based epoxy resin (EEW 625-725 g/eq) | Momentive Specialty Chemicals, Inc., Columbus, OH |
| Heloxy67 | diglycidyl ether of 1,4-butanediol | Momentive Specialty Chemicals, Inc., Columbus, OH |
| GPTMS | 3-(Glycidoxypropyl) Trimethoxysilane | Chemical Technologies, Levittown PA |
| UVI6976 | Triaryl-sulfonium hexafluoroantimonate, 50 wt % in propylene carbonate - cationic initiator | Aceto Corporation, Port Washington NY |
| ACCLAIM 2200 | Polyether polyol | Covestro, LLC, Leverkusen Germany |
| GMA | Glycidyl methacrylate | Sigma Aldrich, St. Louis, MO |
| HPPA | 2-Hydroxy-3-phenoxypropyl acrylate - interphase crosslinker | KOWA American Corporation, New York, NY |
| HTGO | High Tg Oligomer comprised of IBOA/AA (97/3) with MW 39,900 | HTG-6 as described in U.S. Pat. No. 9,290,682 |

Methods of Making Adhesive Composition and Tapes

Method A

Coatable viscosity syrup polymers were prepared by charging a one quart jar with 350 grams of acrylic monomer in the appropriate ratio according to TABLE 2 and 0.14 grams of OMNIRAD 651, and stirred until the photoinitiator had dissolved and a homogeneous mixture was obtained. The mixture was degassed by introducing nitrogen gas into it through a tube inserted through an opening in the jar's cap and bubbling vigorously for at least 5 minutes. While stirring, the mixture was exposed to UV-A light until a pre-adhesive syrup having a viscosity deemed suitable for coating was formed. Following UV exposure, air was introduced into the jar. The light source was an array of LEDs having a peak emission wavelength of 365 nm.

Method B (Compounding)

"Epoxy-polyol premix" was prepared by charging a glass jar with epoxy resins (EPON828, EPON1001, EPON872, EPON1007) in the amounts shown and heating the slurry in a 135° C. oven until a homogenous mixture was obtained. ACCLAIM 2200 was added with stirring and the mixture was allowed to cool to ambient temperature. Immediately prior to use, the mixture was re-heated to ca. 200° F. (93° C.) to decrease viscosity for ease of pouring.

In a glass jar, acrylic mixture from METHOD A (TABLE 2), GPTMS, HDDA, UVI6976, epoxy-polyol blend, and OMNIRAD 819 were combined in amounts shown in Tables 2 and 3. For specified samples, fillers and/or interphase crosslinkers (HPPA, GMA) were then added. The jar was closed tightly with a foil-lined cap and placed on a jar-roller overnight protected from light.

Method C (Tape-making)

Uncured tapes were obtained by carrying out the below procedure on each of the adhesive coating formulations from the above step. A layer of the adhesive coating solution was coated between two silicone release-coated PET liners using a two-roll coater having a gap setting of 0.010 inches (254 micrometers) greater than the combined thickness of the two liners. The coated layer was exposed to a total UV-A energy of approximately 3400 mJ/cm$^2$ (from two sides with approximately 1700 mJ/cm$^2$ per side) using a plurality of LED lamps with a peak emission wavelength of 405 nm. The total UV exposure was determined using a POWER PUCK II radiometer equipped with low power sensing head (EIT, Inc., Sterling, VA).

Test Methods for Evaluating Adhesive

Shear dynamic mechanical analysis (DMA) was performed on fully cured samples to determine the glass transition temperature(s). Samples were prepared for rheology by laminating several adhesive layers together until a minimum of 0.5 mm was achieved. The stack of adhesive was irradiated using an array of LEDs having a peak emission wavelength of 365 nm (CLEARSTONE TECHNOLOGIES, Hopkins, MN). The total UV-A energy was determined using a POWER PUCK II radiometer (EIT, Inc., Sterling, VA) achieving 7.5 J/cm$^2$ and allowed to fully cure over 24 hours. Dynamic Mechanical Analysis (DMA) using a DHR-3 parallel plate rheometer (TA Instruments, New Castle, DE, USA) was performed by punching an 8 mm circle. A temperature sweep was performed at 1 Hz from −30° C. to 150° C. and the tan (δ) peak(s) recorded.

Pluck-Cleavage Test—A plastic mirror button having a bonding surface of about 25 mm× about 30 mm and tempered glass of about 100 mm× about 100 mm× about 5 mm were prepared, and the bonding surfaces of the mirror button and the tempered glass (101 of FIG. 1A and 1B) were cleaned with isopropyl alcohol. The adhesive tape was cut to a size of about 25 mm× about 30 mm, and the first release PET liner was removed, and the curable adhesive layer of the adhesive tape was applied to the adhesive surface of the mirror button under pressure. The second release liner was removed and the composition was exposed to UV-A radiation using an array of LEDs having a peak emission wavelength of 365 nm (CLEARSTONE TECHNOLOGIES, Hopkins, MN). The total UV-A energy was determined using a POWER PUCK II radiometer (EIT, Inc., Sterling, VA) achieving 7.5 $J/cm^2$. After the exposed curable adhesive layer was applied to the tempered glass under pressure, the assembly was wet-out by means of applying a static load to the specimen for 6 seconds. Specimens were allowed to cure at ambient temperature and humidity for 24 hours prior to testing. Using a jig 100 shown in FIG. 1A of US20220081599, a force for peeling the mirror button from one of the tips of the mirror button 103 in its long axis direction (the upward arrow in FIG. 1A) was applied to the mirror button 103 at a rate of 50 mm/minute, and the peel strength was measured. FIG. 1B of US20220081599 is a schematic view of the condition after completion of the peel strength test.

Overlap Shear Test—Aluminum substrates measuring 1"×4"×0.064" (2.5 cm×10.2 cm×0.16 cm) were prepared by scrubbing the terminal 1" (2.54 cm) with SCOTCH-BRITE GENERAL PURPOSE HAND PAD #7447 (3M) attached to a handheld power sander (RYOBI 2 Amp Corded ¼ Sheet Sander, Hiroshima, Japan) followed by washing with isopropanol and air-drying. A ½"×1" (1.3 cm×2.5 cm) portion of the uncured tape was applied to the sanded end of one substrate. The release liner was removed from one side of the uncured tape and the tape was applied to one aluminum substrate. The second release liner was removed and the composition was exposed to UV-A radiation using an array of LEDs having a peak emission wavelength of 365 nm (CLEARSTONE TECHNOLOGIES, Hopkins, MN). The total UV-A energy was determined using a POWER PUCK II radiometer (EIT, Inc., Sterling, VA) achieving 7.5 $J/cm^2$. A second coupon was applied to the irradiated sample, thus closing the bond. The assembly was wet out by means of applying a static load to the specimen for 6 seconds. Specimens were allowed to cure at ambient temperature and humidity for 24 hours prior to testing.

A dynamic overlap shear test was performed at ambient temperature using an INSTRON TENSILE TESTER MODEL 5581 (Instron Corp., Canton, MA) equipped with a 10 kN load cell. Test specimens were loaded into the grips and the crosshead was operated at 0.1" (0.25 cm) per minute, loading the specimen to failure. Stress at break was recorded in units of megapascals. Three specimens of each sample were tested, and the average result calculated.

TABLE 2

Monomer ratios and calculated Tg of acrylic copolymer

| Entry | Description | Fox Tg (° C.) | GRAMS OM651 | BA | THFA | E3A | IBOA | 2EHA | IOA | TBCHA |
|---|---|---|---|---|---|---|---|---|---|---|
| A | BA/THFA (50/50) | −35.3 | 0.14 | 50 | 50 | | | | | |
| B | BA/THFA (60/40) | −39.3 | 0.14 | 60 | 40 | | | | | |
| C | BA/THFA (70/30) | −43.1 | 0.14 | 70 | 30 | | | | | |
| D | 2EHA/THFA (40/60) | −30.1 | 0.14 | | 60 | | | 40 | | |
| E | 2EHA/THFA (50/50) | −34.1 | 0.14 | | 50 | | | 50 | | |
| F | 2EHA/THFA/IBOA (40/45/15) | −20.4 | 0.14 | | 45 | | 15 | 40 | | |
| G | 2EHA/THFA/IBOA (30/50/20) | −12.4 | 0.14 | | 50 | | 20 | 30 | | |
| H | 2EHA/THFA/IBOA (30/45/25) | −8.8 | 0.14 | | 45 | | 25 | 30 | | |
| I | IOA/THFA/TBCHA (30/45/25) | −11.8 | 0.14 | | 45 | | | | 30 | 25 |
| J | BA/E3A/IBOA (35/35/30) | −25.9 | 0.14 | 35 | | 35 | 30 | | | |
| K | BA/E3A/IBOA (35/40/25) | −31.3 | 0.14 | 35 | | 40 | 25 | | | |
| L | BA/THFA/IBOA (55/20/25) | −21.6 | 0.14 | 55 | 20 | | 25 | | | |
| M | BA/THFA/IBOA (60/20/20) | −27.1 | 0.14 | 60 | 20 | | 20 | | | |

TABLE 3

Tape formulations.

| | Acrylic Copolymer ID | Parts | Parts HTGO | GMA | HPPA | HDDA | OM819 | Epon828 | Epon1001 |
|---|---|---|---|---|---|---|---|---|---|
| CE-1 | A | 37.7 | | | | 0.14 | 0.20 | 30.6 | 15.3 |
| CE-2 | B | 37.7 | | | | 0.22 | 0.20 | 30.6 | 15.3 |
| CE-3 | C | 37.7 | | | | 0.22 | 0.20 | 30.6 | 15.3 |
| CE-4 | D | 37.7 | | | | 0.20 | 0.20 | 30.6 | 15.3 |
| EX-1 | E | 37.7 | | | | 0.20 | 0.20 | 30.6 | 15.3 |
| EX-2 | F | 37.7 | | | | 0.20 | 0.20 | 30.6 | 15.3 |
| EX-3 | G | 37.7 | | | | 0.20 | 0.20 | 30.6 | 15.3 |
| EX-4 | H | 37.7 | | | | 0.20 | 0.20 | 30.6 | 15.3 |
| EX-5 | I | 37.7 | | | | 0.24 | 0.20 | 30.6 | 15.3 |
| EX-6 | J | 37.7 | | | 3.77 | 0.20 | 0.20 | 30.6 | 15.3 |
| EX-7 | K | 30.16 | 7.54 | 1.25 | | 0.22 | 0.20 | 30.6 | 15.3 |
| EX-8 | K | 30.16 | 7.54 | | 3.77 | 0.20 | 0.20 | 26.15 | |
| EX-9 | L | 32.10 | 5.66 | | 3.77 | 0.20 | 0.20 | 30.6 | 15.3 |
| EX-10 | M | 33.93 | 3.77 | | 3.77 | 0.20 | 0.20 | 24.85 | |

TABLE 3-continued

Tape formulations.

| | Parts | | | | | | |
|---|---|---|---|---|---|---|---|
| | Epon1007 | Epon872 | Heloxy67 | PPG2000 | UVI6976 | GPTMS | SUM |
| CE-1 | | | | 11.8 | 3 | 1 | 99.74 |
| CE-2 | | | | 11.8 | 3 | 1 | 99.82 |
| CE-3 | | | | 11.8 | 3 | 1 | 99.82 |
| CE-4 | | | | 11.8 | 3 | 1 | 99.80 |
| EX-1 | | | | 11.8 | 3 | 1 | 99.80 |
| EX-2 | | | | 11.8 | 3 | 1 | 99.80 |
| EX-3 | | | | 11.8 | 3 | 1 | 99.80 |
| EX-4 | | | | 11.8 | 3 | 1 | 99.80 |
| EX-5 | | | | 11.8 | 3 | 1 | 99.84 |
| EX-6 | | | | 11.8 | 3 | 1 | 103.57 |
| EX-7 | | | | 11.8 | 3 | 1 | 101.07 |
| EX-8 | 15.32 | 7.66 | | 8.67 | 3 | 1 | 103.67 |
| EX-9 | | | | 11.8 | 3 | 1 | 103.63 |
| EX-10 | 15.32 | | 5.78 | 11.85 | 3 | 1 | 103.67 |

TABLE 4

Summary of results.

| | | Uncured Tape | Cured Tape Shear DMA, Temp Ramp | | | | Glass-plastic Pluck Cleavage | | Al—Al Overlap Shear | |
|---|---|---|---|---|---|---|---|---|---|---|
| | | Appearance | Tg1 | | Tg2 | | 80° C. | RT | 60° C. | RT |
| Acrylic Composition | | | ° C. | tan(δ) | ° C. | tan(δ) | Avg (N) | Avg (N) | Avg (MPa) | Avg (MPa) |
| CE-1 | BA/THFA (50/50) | transparent | 33.3 | 0.85 | | | 168 | 620 | 2.5 | 12.3 |
| CE-2 | BA/THFA (60/40) | transparent | 33.8 | 0.77 | | | | | | |
| CE-3 | BA/THFA (70/30) | transparent | 31.3 | 0.61 | | | | | 2.1 | |
| CE-4 | 2EHA/THFA (40/60) | transparent | 34.7 | 0.70 | | | 169 | 594 | 2.6 | 10.7 |
| EX-1 | 2EHA/THFA (50/50) | opaque | 9.6 | 0.30 | 61.9 | 0.31 | 228 | 530 | 3.4 | 8.7 |
| EX-2 | 2EHA/THFA/IBOA (40/45/15) | opaque | 6.3 | 0.27 | 72.3 | 0.34 | 294 | 534 | 3.9 | 8.2 |
| EX-3 | 2EHA/THFA/IBOA (30/50/20) | translucent | 36.1 | 0.61 | 78.4 | 0.13 | 278 | 563 | 5.2 | 16.6 |
| EX-4 | 2EHA/THFA/IBOA (30/45/25) | opaque | 27.5 | 0.50 | 61.3 | 0.25 | 252 | 623 | 3.9 | 11.8 |
| EX-5 | IOA/THFA/TBCHA (30/45/25) | opaque | 41.1 | 0.76 | 74.8 | 0.12 | | | 4.1 | 15.1 |
| EX-6 | BA/E3A/IBOA (35/35/30) + HPPA | opaque | 8.7 | 0.82 | 68.5 | 0.14 | 319 | 937 | 3.2 | 11.0 |
| EX-7 | BA/E3A/IBOA (35/40/25) + HTGO + GMA | opaque | 22.4 | 0.52 | 71.4 | 0.23 | 385 | 1094 | 4.2 | 11.4 |
| EX-8 | BA/E3A/IBOA (35/40/25) + HTGO + HPPA | opaque | 0.1 | 0.33 | 66.8 | 0.43 | 296 | 509 | 2.2 | 4.6 |
| EX-9 | BA/THFA/IBOA (55/20/25) + HTGO + HPPA | opaque | 16.6 | 0.46 | 62.0 | 0.34 | 394 | 403 | 4.3 | 9.5 |
| EX-10 | BA/THFA/IBOA (60/20/20) + HTGO + HPPA | opaque | −5.5 | 0.3 | 63.2 | 0.44 | 316 | 373 | 3.0 | 4.7 |

What is claimed is:

1. An adhesive composition comprising:

30-50 wt. % of an epoxy resin component; and 20 to 50 wt. % of a random (meth)acrylic polymer comprising polymerized units of monofunctional (meth)acrylate monomers comprising:

i) low Tg (meth)acrylate monomer(s) wherein a homopolymer thereof has a glass transition temperature (Tg) of less than 0° C. in an amount of at least 20 wt. %;

ii) non-acidic polar (meth)acrylate monomer(s) in an amount of at least 20 wt. %; and wherein the amount of monomers is based on the total amount of monofunctional (meth)acrylate monomers;

wherein the adhesive composition has two glass transition temperatures (Tgs) after curing of the monofunctional (meth)acrylate monomers and epoxy resin component.

2. The adhesive composition of claim 1 wherein the adhesive composition has a first Tg in a range from −10° C. to 50° C.

3. The adhesive composition of claim 1 wherein the adhesive composition has a second Tg greater than 50, 55, 60, 65, 70, or 75° C.

4. The adhesive composition of claim 1 wherein a homopolymer of one or more of the low Tg (meth)acrylate monomer(s) have a Tg less than −10, −20, −30, −40, −50, or −60° C.

5. The adhesive composition of claim 1 wherein the low Tg (meth)acrylate monomer(s) are present in an amount of at least 30, 40, 50, or 60 wt. %.

6. The adhesive composition of claim 1 wherein the low Tg monomer(s) (meth)acrylate monomer(s) comprise an alkyl group with 4 to 12 carbon atoms.

7. The adhesive composition of claim 1 wherein the non-acidic polar (meth)acrylate monomer(s) comprises an ether group or hydroxyl group.

8. The adhesive composition of claim 1 wherein a homopolymer of one or more of non-acidic polar (meth) acrylate monomer(s) have a Tg less than −10, −20, −30, −40, or −50° C.

9. The adhesive composition of claim 1 wherein one or more non-acidic polar high Tg (meth)acrylate monomer(s) has a Tg of at least 50, 60, 70, 80, or 90° C.

10. The adhesive composition of claim 1 wherein the adhesive comprises one or more non-acidic high Tg (meth) acrylate monomer(s) comprising a cycloaliphatic moiety.

11. The adhesive composition of claim 1 wherein the epoxy resin(s) comprises an aromatic group inclusive of a bisphenol moiety.

12. The adhesive composition of claim 1 wherein the adhesive composition further comprises a hydroxy-functional component inclusive of polyether polyols.

13. The adhesive of claim 1 wherein the adhesive composition further comprises up to 2 wt. % of multifunctional (meth)acrylate crosslinker and/or up to 5 wt. % an interphase crosslinker comprising a (meth)acrylate group and an epoxy group.

14. The adhesive composition of claim 1 wherein the cured adhesive composition has a pluck cleavage at 80° C. of at least 200 newtons and/or an aluminum overlap shear at 60° C. of at least 2, 3, 4, or 5 MPa.

15. An article comprising at least one layer of the adhesive composition of claim 1 disposed on a major surface of a substrate.

16. The article of claim 15 wherein the substrate is a polymeric film or a release liner.

17. The article of claim 15 wherein the article is a tape comprising a layer of the adhesive composition disposed on one major surface or both major surfaces of the substrate.

18. The article of claim 17 wherein the epoxy resin component is uncured.

19. A method of bonding comprising:

providing an article of claim 15, contacting a layer of the adhesive composition with a surface of an article; and curing the epoxy resin component.

20. A battery or component thereof comprising a metal surface and the adhesive of claim 1 disposed on the metal surface.

21. An adhesive composition comprising:

30-50 wt. % of an epoxy resin component; and 20 to 50 wt. % of (meth) acrylic polymer comprising polymerized units of monofunctional (meth) acrylate monomers comprising:

i) low Tg (meth) acrylate monomer(s) wherein a homopolymer thereof has a glass transition temperature (Tg) of less than 0° C. in an amount of at least 20 wt. %;

ii) non-acidic polar (meth) acrylate monomer(s) in an amount of at least 20 wt. %; and wherein the amount of monomers is based on the total amount of monofunctional (meth) acrylate monomers;

wherein the adhesive composition has a first and second glass transition temperature (Tg) after curing of the monofunctional (meth) acrylate monomers and epoxy resin component and the first Tg is in a range of from −10° C. to 50° C.

22. The adhesive composition of claim 21 wherein the second Tg is greater than 50, 55, 60, 65, 70, or 75° C.

23. The adhesive composition of claim 21 wherein the non-acidic polar (meth) acrylate monomer(s) comprises an ether group or hydroxyl group.

24. The adhesive composition of claim 21 wherein the adhesive comprises one or more non-acidic high Tg (meth) acrylate monomer(s) comprising a cycloaliphatic moiety.

25. The adhesive composition of claim 21 wherein the adhesive composition further comprises a hydroxy-functional component inclusive of polyether polyols.

26. The adhesive of claim 21 wherein the adhesive composition further comprises up to 2 wt. % of multifunctional (meth)acrylate crosslinker and/or up to 5 wt. % an interphase crosslinker comprising a (meth)acrylate group and an epoxy group.

27. An article comprising at least one layer of the adhesive composition of claim 21 disposed on a major surface of a polymeric film or a release liner, wherein the epoxy resin component is uncured.

28. A battery or component thereof comprising a metal surface and the adhesive of claim 21 disposed on the metal surface.

* * * * *